July 2, 1935.  G. H. CLAY  2,006,669
TRUCK TANK CONSTRUCTION
Filed May 18, 1934
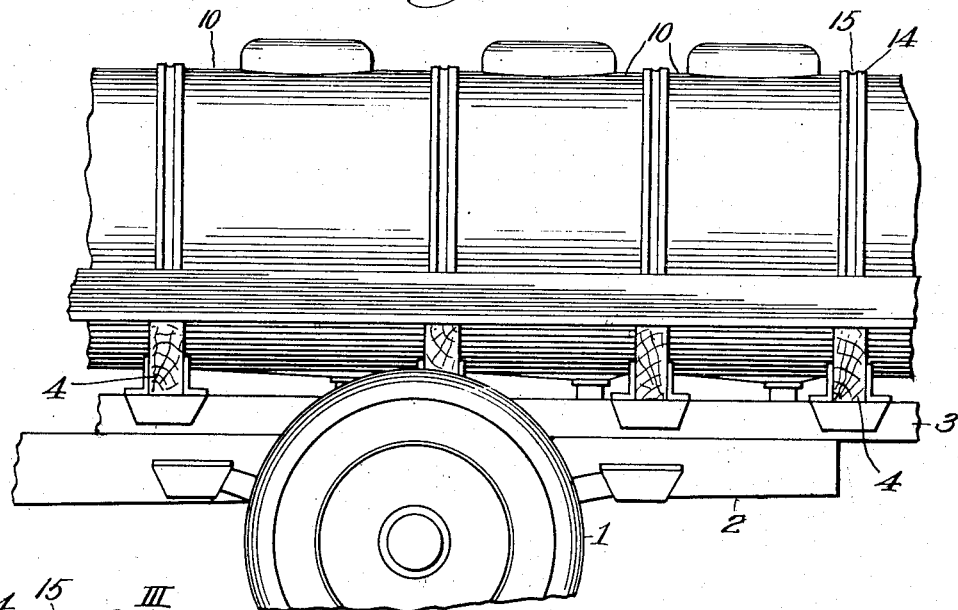
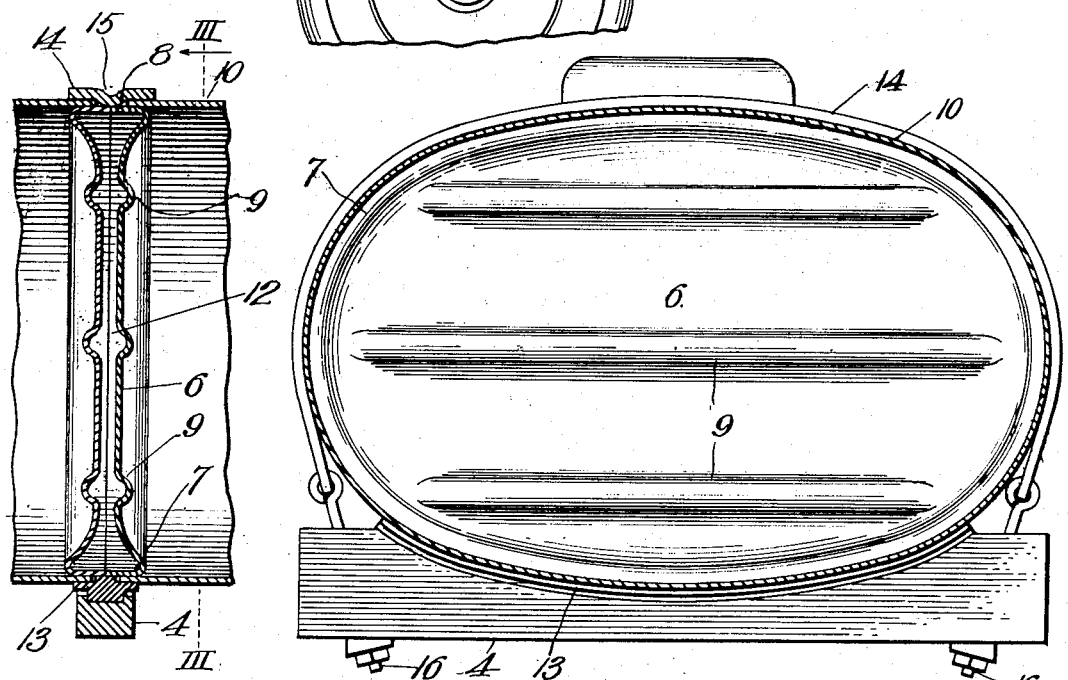
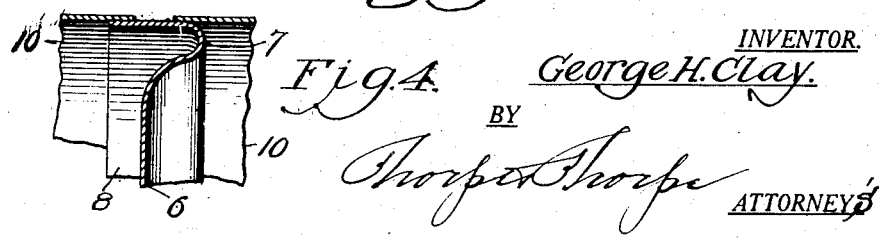
INVENTOR.
George H. Clay.
BY
Thorpe & Thorpe
ATTORNEYS Patented July 2, 1935

2,006,669

UNITED STATES PATENT OFFICE 2,006,669

TRUCK TANK CONSTRUCTION

George H. Clay, Kansas City, Mo.

Application May 18, 1934, Serial No. 726,284

2 Claims. (Cl. 220—22)

This invention relates to tank construction and more particularly to multiple tanks providing a series of individual compartments such as used in tank trucks. One of my objects is to provide a tank of the type mentioned which is more readily constructed and will result in a more perfectly symmetrical job than in present tanks of this general character, the heads of each tank section of the invention providing means for both alining the various compartments one with another and also providing means for securing the sections together and to the truck chassis to relieve the tank shells of a part of the load they are now required to carry.

Another object of the invention is to provide a construction in which the heads of the tank sections act as spacing means to insure the proper air space between tank divisions, when a double bulkhead construction is to be produced.

A further object of the invention is to provide a double bulkhead construction for the convenient and ready removal and repair of leaky compartments or the like.

A still further object of the invention is to provide the heads with spacing skirts so that the skirts can rest on the cross sills of a truck to carry the load and space is also provided to receive the usual hold down clamping bands to tie the tank down to the cross sills.

A further object of the invention is to provide a convenient and wide welding surface for securing the tank shells to the bulkheads, particularly where a multiple bulkhead construction is to be produced.

With the general objects named in view and others as will hereinafter appear; the invention consists in certain novel and useful features of construction and organization of parts as hereinafter described and claimed; and in order that it may be fully understood, reference is to be had to the accompanying drawing, in which:—

Figure 1 is a side elevation of a tank construction embodying the invention.

Figure 2 is an enlarged longitudinal section through the construction.

Figure 3 is a section on the line III—III of Figure 2.

Figure 4 is a fragmental section through a modified form of construction.

In the said drawing, where like reference characters identify corresponding parts in all of the figures, I represents a tank truck provided with the usual longitudinal frame member 2, to which longitudinal sills 3 are secured. Extending transversely of the truck and secured to the sills 3 are a series of cross sills 4, said cross sills being spaced apart in accordance with the lengths of the tank sections they are designed to carry, each sill having upwardly curved ends to partially embrace a tank.

The individual tank sections or compartments are constructed as follows: In order to insure that each tank head shall be of equal shape and size, it is preferable to die press the heads, each head being preferably provided with a bowed or dished center portion 6 which merges at its edges into reversely bowed or dished portion 7, the latter terminating in a skirt 8 of proper size and shape and of relatively great width to provide a substantial welding surface for the tank shells and for a spacing function as will hereinafter appear. Although heads made as described will be found sufficiently strong to carry the load, it may be found desirable in some cases to provide said heads with a series of horizontal swedges 9.

In the construction and assembly of the tank compartments, two heads are spaced proper distances apart with the convex sides of their portions 6 disposed to the outside of the compartments so that the skirts 8 may also project outwardly. The tank shell 10, with its edges partially overlapping on the skirts 8 is now securely welded in position. Each compartment is thus a complete tank and as their welds are on a flat surface they may be easily made leak proof by the welder and are subject to convenient inspection. After the tank compartments have been made as described, they are assembled on suitable supports with the edges of the skirts 8 in abutting relation, the skirts being of sufficient width as to provide proper air spaces 12 between adjacent units, and the welder proceeds to unite the units by a series of tacks or spaced welds 17 around the circumference of the abutting skirts. The final result is a single tank composed of a number of spaced compartments, the air spaces between adjacent compartments being sufficiently vented by the untacked portions of the skirts, or a series of vent holes in the skirts may be provided if deemed desirable.

When the gage of the metal has been properly chosen in accordance with the weight of the loaded tank, it will be apparent that the entire assembly is more or less flexible due to the relative area of the skirts beyond the ends of the tank shells. If any tank compartment should be injured or spring a leak, the tack welds of the skirts may be readily severed and the compartment bodily removed.

Before the completed tank has been placed on the truck chassis, it has been found desirable to weld to the exposed portions of adjacent skirts, a wear iron or cradle 13, which is adapted to fit down in a groove in one of the transverse sills 4. The tank load is thus carried by the tank heads and not by the shell of the tank, the skirts also providing a convenient space to receive a clamp or hold-down band 14 having an inwardly projecting bead 15 for contacting the tank skirts, the ends of said clamp band being secured to the sills by eye bolts 16 or in any other suitable way.

In Figure 4, a slightly modified construction is shown, in which adjacent compartments are provided with a single bulkhead. This construction is otherwise similar to that above described, but it does not possess the advantage of ready removal of a damaged compartment.

From the above description, it will be apparent that I have produced a construction embodying all of the features of advantage set forth as desirable; and while I have described and illustrated what now appear to be the preferred constructions it is to be understood that I reserve the right to all changes properly falling within the spirit of the invention and without the ambit of the prior art.

I claim:—

1. A multi-compartment tank comprising alined cylindrical shells of similar cross-sectional form and area and spaced apart, heads within the ends of adjacent shells and corresponding in contour thereto, the heads having peripheral skirts or flanges welded to and projecting outward from the respective shells and abutted together, said heads also being dished radially-outward in all directions from the inner ends of their respective skirts a lesser distance than the width of the latter to provide an interposed air space of greatest width adjacent the abutted skirts.

2. A multi-compartment tank comprising alined cylindrical shells of similar cross-sectional form and area and spaced apart, heads within the ends of adjacent shells and corresponding in contour thereto, the heads having peripheral skirts or flanges welded to and projecting outward from the respective shells and abutted together, said heads also being dished radially-outward in all directions from the inner ends of their respective skirts a lesser distance than the width of the latter to provide an interposed air space of greatest width adjacent the abutted skirts, in combination with a cradle underlying and fitting between the ends of adjacent shells and against the abutted skirts, a bolster underlying and having a groove receiving the lower part of the cradle and a hold-down strap overlapping and fitting between adjacent shells at the top and sides thereof and engaging the abutted skirts and secured to the bolster beyond the ends of the cradle.

GEORGE H. CLAY.